UNITED STATES PATENT OFFICE.

BOTHO SCHWERIN, OF FRANKFORT-ON-THE-MAIN, GERMANY.

METHOD OF SEPARATING SUBSTANCES IN SUSPENSION.

993,888. Specification of Letters Patent. Patented May 30, 1911.

No Drawing. Application filed February 8, 1911. Serial No. 607,285.

*To all whom it may concern:*

Be it known that I, BOTHO SCHWERIN, of Frankfort-on-the-Main, in the Kingdom of Prussia, Germany, have invented certain new and useful Improvements in Methods of Separating Substances in Suspension, of which the following is a specification.

My invention relates to improvements in a method of separating substances in suspension.

My method is particularly useful in separating finely divided substances from coarse or foreign matter which are in suspension in a liquid, for simultaneously separating and dehydrating vegetable, animal, or mineral substances by means of electro-osmosis, or for other purposes.

My invention consists in adding electrolytes to the liquids containing the substances to be separated, the nature of the electrolyte depending upon the character of the substances. If the latter are of such a character, that they would be deposited by the electric current on the cathode, electrolytes of acid character are employed, and if the substances would be deposited on the anode, electrolytes of a basic character are used.

For the purpose of explaining the invention more in detail an example of both methods will be described hereinafter.

As is shown in the art it is difficult to completely separate suspended substances of different weights, or differently charged bodies, or substances of the same character but of different degrees of fineness, because the deposit carries parts of the substance to the ground, and because a part of the coarse or foreign matter is enveloped by the substances in suspension, so that such parts cannot be deposited.

I have discovered that the washing process can be considerably improved, and as a matter of fact can be made ideal in most cases, by adding suitable electrolytes to the substances in suspension, which electrolytes are acids in case of substances which, as for example corundum, are transported by the electric current to the cathode, and bases in case of substances which, as for example clay, coal powder, carborundum, etc., are transported by the electric current to the anode. By additions of this kind the substances are brought into such a state that they are but difficultly deposited, or not deposited at all. Under the microscope the Brownian movements can be observed and are found to become very intense. The coarse and oppositely charged parts, however are not agitated, and they are deposited, which precipitation is effected particularly easy in case of oppositely charged substances, because the additions do not agree with the same.

In processes heretofore in use substances have been added to chamotte, clay, peat, etc. But such additions have not been made for the purpose and with the result of separating the substances, as is the case in my improved method. For example acids have been added to solutions of kaolin, in order to precipitate the same, salts, alkalis, or lime have been added to peat in order to improve its quality, traces of soda have been added to faience, porcelain, or chamotte in order to be able to "found" the same. Furthermore, it is known in the art, that finely divided substances are rendered more fit for suspension by adding thereto suitable electrolytes. But so far the method of adding electrolytes has not been used for separating finely divided substances of different degrees of fineness, or differently charged substances.

The amount of the electrolyte used in my improved method is ordinarily small. For example for 10 kilograms of clay which are in suspension in 20 liters of water an addition of 5 cubic centimeters of a 25% solution of ammonia is sufficient to bring the fine particles of clay into a state in which the admixtures such as sand, etc., are separated within a short time, while the fine clay remains in suspension, and can be further treated, after being mechanically separated from the said admixtures.

By means of electro-osmosis vegetable, animal and mineral substances can be separated and dehydrated, by causing deposition of the solid substances in one or more fractions upon an electrode or a diaphragm located in front of the latter, while the coarse, indifferent, etc., substances remain within the liquid. This process can also be made more speedy, that is the amount of solid substance deposited during a certain time, or for a certain amount of electric energy, can be increased and the amount remaining in suspension in the liquid decreased by adding to the liquid substances which are adapted to assist the separation. Such substances are acids in case of such matter as is carried by the electric current to the cathode, and bases in case of such matters as are carried to the anode. Electrolytes which are not in harmony with this rule are unfavorable in the electro-osmotic process, and can even reduce the same almost to zero, if a large amount of the same is present.

It is well known in the art, that by adding alkaline substances the rapidity of electro-osmotic dehydration of peat is increased, or in other words by the use of such substances the separation of water from peat by such process is more speedy and economical, than when such process is employed without such an addition. Preferably, the electrode toward which the water moves is constructed in the form of wire netting. In this process the solid substances move to the anode in the form of a uniform and coherent mass and are deposited on the said anode. But a separation of the fine parts from the coarse and foreign matter is not obtained because in the thick suspension the separation aimed at by my invention is impossible, as the coarse and foreign substances are carried by the matter in suspension and the desired precipitation is thereby prevented. Even if at the beginning of the process, the suspension was sufficiently thin to permit a precipitation, it would soon become thick and unsuitable for the separation by the reduction in the amount of water. In my improved method the process is the reverse of the old one, the water remains in its place, and the solid substances are removed. Therefore the suspension becomes thinner and more adapted for the process.

Finely divided substances are sometimes more or less indifferent to the action of the electric current, and they are not brought into the proper state by electrolytes as has been described above. I have found, that such substances can be made electrically active by causing them to adsorb colloidal substances of a strong electropositive or electronegative character. The term "adsorb" is used herein in the sense and with the meaning given it in recent years, namely, as defining the process by which dissolved or colloidally dissolved bodies are caused to adhere to another body by surface attraction. Substances of this character are for example humic acid, silicic acid, aluminum hydroxid, etc. By adding suitable electrolytes the substances are brought into the proper state, so that the method of separation explained above can be carried out.

Example: A suspension of indifferent clay is mixed with a very small amount of humic acid. After some time a suitable electrolyte, for example sodium lye, is added. The suspension is gradually transformed into its proper state, and separation is started. Under some circumstances the same result can be obtained by adding silicic acid in the form of a solution of water glass; the silicic acid is liberated by hydrolysis and adsorbed by the clay while the alkali which acts as a suitable electrolyte transforms the substances.

Also when using electro-osmosis for separating and dehydrating vegetable, animal, and mineral substances the substances are found to be more or less indifferent. Though they are transmitted to the proper pole by the electric current yet they are not properly deposited thereon, but the deposit remains rich in water and soft, and under certain circumstances it falls from said pole. Also in this case such substances can be made more active electrically by causing them to adsorb colloidal substances of a strong electropositive or electronegative character. Afterward, the said substances are brought into the proper state by adding suitable electrolytes, and they are then more suitable for separation and dehydration by means of electro-osmosis. Now they are deposited in a strongly dehydrated state on the pole or the diaphragm located between the latter and the substances.

Having thus described the invention, what is claimed is:

1. The herein described method of electro-osmotically separating substances suspended in a solution which comprises adding an electrolyte to said solution, which electrolyte is capable of neutralizing the ion normally liberated at the electrode toward which the substance tends to migrate.

2. The herein described method of electro-osmotically separating substances suspended in a solution, which comprises causing said substances to adsorb strongly non-neutral colloidal bodies, and adding to the solution an electrolyte capable of neutralizing the ion normally liberated at the electrode toward which the substance tends to migrate.

In testimony whereof I have signed my name to this specification in the presence of two subscribing witnesses.

BOTHO SCHWERIN.

Witnesses:
 JEAN GRUND,
 FRIEDEL F. COLLISCHANN.